April 14, 1931.   C. H. FIKE   1,800,250
AIR COMPRESSOR DRIVE MEANS FOR GAS ELECTRIC LOCOMOTIVES
Filed May 15, 1929
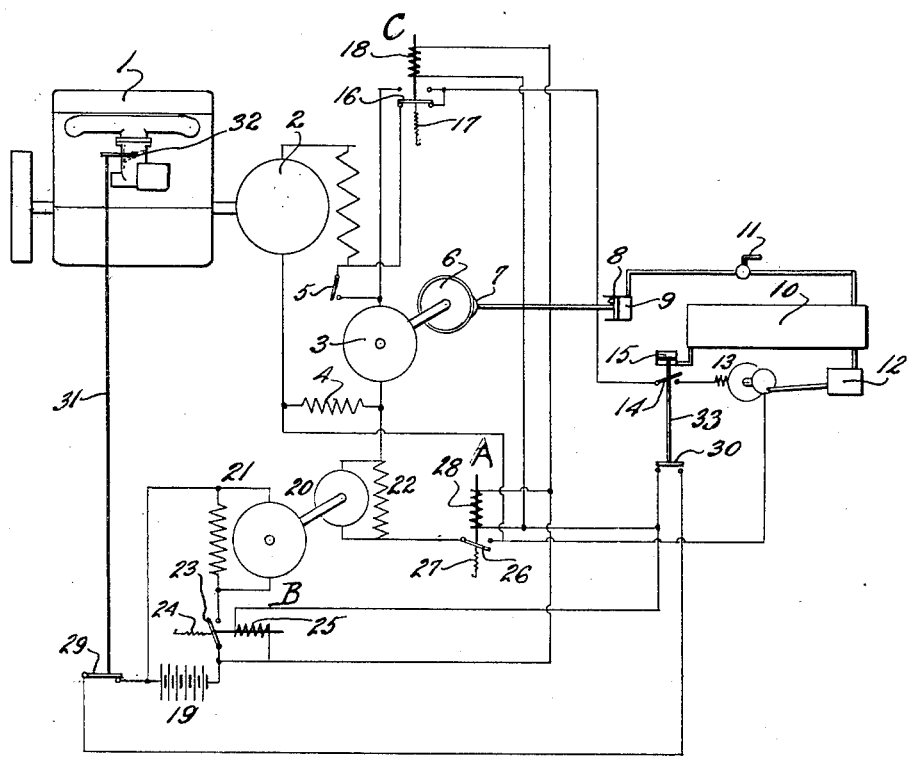
INVENTOR
CHARLES H. FIKE
BY
Brackett, Hyde, Higley & Meyer
ATTORNEYS Patented Apr. 14, 1931

1,800,250

UNITED STATES PATENT OFFICE

CHARLES H. FIKE, OF CLEVELAND, OHIO, ASSIGNOR TO THE ELECTRO-MOTIVE COMPANY, OF CLEVELAND, OHIO, A CORPORATION OF OHIO

AIR-COMPRESSOR DRIVE MEANS FOR GAS-ELECTRIC LOCOMOTIVES

Application filed May 15, 1929. Serial No. 363,216.

This invention relates to so-called gas-electric motor vehicles, such as are employed in high-speed auxiliary service by steam railroads, operating alone as a driven unit or as a locomotive.

A motor car of the type to which reference is had, employs a large internal combustion engine, as its prime mover. The engine is direct connected with an electric generator, and the traction wheels of the vehicle are arranged to be driven by electric motors, receiving power from the generator.

Such a car is usually provided with air brakes supplied from a compressed air reservoir in which pressure is maintained between limits, a motor driven air compressor being provided for the purpose; and under usual operating conditions the air compressor motor is driven from the generator. Thus brake service is dependent upon functioning of the motor, which is therefore in the general sense, the brake motor.

However, there occasionally arises an operating condition where the profile of the road includes long continuous down grade wherein the power demand is slight yet the brake demand high, so that it becomes necessary to operate the air compressor when there is little or no demand from the power plant for traction purposes. But operating the engine on light loads, as for the purpose of providing generator output sufficient merely for the brake motor greatly increases engine maintenance.

It, therefore, becomes desirable to have a source of power supply for the brake motor other than the main generator, and this is broadly the object of my invention.

Briefly, I arrange to obtain this power from one of the traction motors using the same as a generator, it being understood that, the traction motors being positively connected with the traction wheels, the drive will be from wheel to motor during coasting. To this end a source of field excitation is required and since the main generator may be shut down, an independent source must be had. I therefore arrange for connecting a battery for the purpose; and this battery may conveniently be the usual engine starting battery, in which case a motor-generator set is inserted between the battery and the traction motor field. This, then, constitutes another object of my invention.

The exact nature of my invention together with further objects and advantages thereof will be apparent from the following description taken in connection with the accompanying drawing which is a diagrammatic showing of pertinent parts of a vehicle of the class described, with an application of my invention associated therewith; it being understood that all of the parts are associated with the usual vehicle frame which is not shown.

The principal parts for propulsion of the vehicle insofar as pertains to this invention, are an internal combustion engine 1 with direct connected generator 2, motor 3 having a field winding 4 and receiving power from the generator subject to suitable control means here represented as a simple switch 5, and a traction wheel 6, positively, and as indicated, directly connected with the motor 3.

The wheel 6 is equipped with a brake 7 shown as applied to the wheel by piston 8 movable in a cylinder 9 under the action of compressor air from the reservoir 10 subject to operation of the valve 11. Air is forced into the reservoir 10 by a compressor pump 12 driven by a compressor motor 13.

The motor 13 ordinarily receives its power from the generator 2, and is started and stopped by a switch 14, which automatically moves under the control of a piston 15, responsive to pressure within the reservoir 10, to maintain the reservoir pressure between limits as usual.

The compressor motor circuit includes magnetic switch C having a bridging contactor 16 balanced to the indicated position as by spring 17 and having a coil 18 by which the contactor 16 may be moved against the spring 17 to disconnect the compressor motor from the generator, and make alternate contact to establish a circuit between the motor 3 and the compressor motor 13.

19 is a battery carried by the vehicle and which may be that employed in starting the engine. For the purpose of utilizing the battery 19 to excite the traction motor field 4, I insert therebetween a motor-generator set 20 having an input motor 21 and direct connected output generator 22.

Connection between the battery and the motor 21 is immediately controlled by magnetic switch B, the contactor 23 of which is yieldably urged to open position as by spring 24, and is movable to closed position by coil 25.

The connection between the output generator 22 and the field 4 of the traction motor 3 includes a magnetic switch A, the contactor 26 of which is yieldably urged to open position as by spring 27, and movable to closed position by the coil 28; so that the switch A immediately controls this exciting circuit.

The coils 18, 25 and 28 of the magnetic switches C, B and A respectively are arranged in parallel relation as indicated, in a circuit which includes the battery 19, the throttle switch 29 and the governor interlock switch 30; so that moving of the armature 16 of the switch C to connect the brake motor with the traction motor, closing of the switch B to connect the exciting motor-generator set with the battery, and closing of the switch A to connect the traction motor field in the exciting circuit, are all dependent upon simultaneous closing of the switches 29 and 30.

The switch 29 has connection as indicated at 31 with the throttle means 32 of the engine 1 whereby the switch 29 will close only as the engine 1 is throttled down.

The switch 30 has connection as at 33 with the reservoir-pressure-responsive piston 15, and this connection is such that the switches 14 and 30 will open and close together.

Thus the traction motor exciting means is interlocked with the engine, whereby excitation may be had only when the engine is substantially shut down, and is interlocked with the brake motor whereby excitation may be had only when the brake air pressure is below the required minimum.

It will be apparent from the foregoing that whenever the vehicle is coasting, with the engine shut down, and there is a demand upon the compressor, the compressor motor will be served by the traction motor, acting as a generator and having its field excited automatically as required.

What I claim is:—

1. In a self-propelled vehicle of the class described and having a traction wheel, an electric traction motor for driving the same and arranged to be driven thereby when the vehicle is coasting, a generator for driving said motor and an engine for driving said generator, brake means for said wheel including a brake pump motor, connections for driving said pump motor by said traction motor using the latter as a generator, and means carried by said vehicle and arranged for exciting the field of said traction motor according to the demand of said pump motor independent of said generator and hence of said engine, whereby said engine may be shut down on long down grades without affecting brake service.

2. In a self-propelled vehicle of the class described and having a traction wheel, an electric traction motor for driving the same and arranged to be driven thereby when the vehicle is coasting, a generator for driving said motor and an engine for driving said generator, brake means for said wheel including a brake pump motor, connections for driving said pump motor by said traction motor using the latter as a generator, and means carried by said vehicle and arranged for exciting the field of said traction motor independent of said generator and hence of said engine, said exciting means including a battery, a motor-generator set arranged to be driven thereby, circuits connecting said parts and including control means therefor, said control means including switch means controlling the connection of the main generator or the traction motor with the pump motor, second switch means controlling the connection of the traction motor field with the generator of said set and third switch means controlling connection of the battery with the motor of said set, and means interassociating said switch means whereby they will act simultaneously, the first to disconnect the pump motor from the generator and connect it to the traction motor as the other two close.

In testimony whereof I hereby affix my signature.

CHARLES H. FIKE.